United States Patent
Ogata et al.

(10) Patent No.: US 11,324,222 B2
(45) Date of Patent: *May 10, 2022

(54) DISPERSION LIQUID, METHOD FOR PRODUCING THE SAME, AND COPPER COMPOUND PARTICLES

(71) Applicant: TOYO SEIKAN GROUP HOLDINGS, LTD., Tokyo (JP)

(72) Inventors: Akiko Ogata, Yokohama (JP); Kazuaki Ohashi, Yokohama (JP); Yasuhiro Kosaka, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/087,266

(22) PCT Filed: Mar. 28, 2017

(86) PCT No.: PCT/JP2017/012727
§ 371 (c)(1),
(2) Date: Sep. 21, 2018

(87) PCT Pub. No.: WO2017/170593
PCT Pub. Date: Oct. 5, 2017

(65) Prior Publication Data
US 2019/0098902 A1  Apr. 4, 2019

(30) Foreign Application Priority Data

Mar. 28, 2016 (JP) .............................. JP2016-064734
Mar. 28, 2016 (JP) .............................. JP2016-064740
Dec. 21, 2016 (JP) .............................. JP2016-247641

(51) Int. Cl.
*A01N 59/20* (2006.01)
*A01N 25/26* (2006.01)
*A01N 25/04* (2006.01)
*A01N 25/22* (2006.01)

(52) U.S. Cl.
CPC ............. *A01N 59/20* (2013.01); *A01N 25/04* (2013.01); *A01N 25/22* (2013.01); *A01N 25/26* (2013.01)

(58) Field of Classification Search
None
See application file for complete search history.

(56) References Cited

U.S. PATENT DOCUMENTS

| | | | | |
|---|---|---|---|---|
| 8,889,164 B2* | 11/2014 | Hashimoto | ............ | A01N 59/20 424/405 |
| 9,161,544 B2* | 10/2015 | Agrawal | ................ | A61L 15/46 |
| 2009/0182337 A1* | 7/2009 | Stopek | .................... | A61L 15/46 606/70 |
| 2009/0208552 A1* | 8/2009 | Faucher | ............. | A61K 31/4353 424/423 |
| 2011/0002872 A1 | 1/2011 | Ohashi et al. | | |
| 2012/0048426 A1 | 3/2012 | Ishizaki | | |
| 2013/0344124 A1 | 12/2013 | Hashimoto et al. | | |
| 2014/0199357 A1 | 7/2014 | Hashimoto et al. | | |
| 2015/0351385 A1 | 12/2015 | Ueda et al. | | |
| 2015/0351386 A1 | 12/2015 | Ueda et al. | | |
| 2016/0255841 A1 | 9/2016 | Ohashi et al. | | |
| 2017/0086463 A1 | 3/2017 | Fujimori et al. | | |
| 2019/0098902 A1 | 4/2019 | Ogata et al. | | |
| 2019/0350195 A1 | 11/2019 | Koganei et al. | | |

FOREIGN PATENT DOCUMENTS

| JP | 05-2318 B2 | 6/1930 |
|---|---|---|
| JP | 06-2688 B2 | 7/1931 |
| JP | 01-213368 A | 8/1989 |
| JP | 03-190975 A | 8/1991 |
| JP | 10-031912 A | 2/1998 |
| JP | 2004-115422 A | 4/2004 |
| JP | 2006-070104 A | 3/2006 |
| JP | 2009-226400 A | 10/2009 |
| JP | 2010-189681 A | 9/2010 |
| JP | 2011-042559 A | 3/2011 |
| JP | 2011-153163 A | 8/2011 |
| JP | 2012-46779 A | 3/2012 |
| JP | 2013-47365 A | 3/2013 |
| JP | 2013-082654 A | 5/2013 |
| JP | 5194185 B1 | 5/2013 |
| JP | 2013-144615 A | 7/2013 |
| JP | 2013159830 A * | 8/2013 |
| JP | 2014-118358 A | 6/2014 |
| JP | 2014-148732 A | 8/2014 |
| JP | 2014-231525 A | 12/2014 |

(Continued)

OTHER PUBLICATIONS

English Translation of JP 05-2318 B2 published on Jun. 11, 1930. (Previously filed on Sep. 21, 1918).

(Continued)

*Primary Examiner* — Celeste A Roney
(74) *Attorney, Agent, or Firm* — Sughrue Mion, PLLC

(57) ABSTRACT

The present invention relates to an antiviral dispersion liquid, a method for producing the same, and an antiviral formed product. This dispersion liquid contains copper compound fine particles and a stabilizer in a non-aqueous solvent, and the copper compound fine particles are coated with fatty acid. The copper compound fine particles are dispersed in a dispersion medium homogeneously and stably, thereby to exhibit efficiently the antiviral properties of the copper compound fine particles.

4 Claims, 1 Drawing Sheet

(56) References Cited

FOREIGN PATENT DOCUMENTS

| | | |
|---|---|---|
| JP | 2015-117187 A | 6/2015 |
| JP | 2015-205998 A | 11/2015 |
| JP | 2017-178942 A | 10/2017 |
| JP | 2018-100255 A | 6/2018 |
| WO | 2014/132606 A1 | 9/2014 |
| WO | 2014/141600 A1 | 9/2014 |
| WO | 2015/064700 A1 | 5/2015 |
| WO | 2018/110332 A1 | 6/2018 |

OTHER PUBLICATIONS

English Translation of JP 06-2688 B2 published on Jul. 20, 1931. (Previously filed on Sep. 21, 1918).
International Search Report of PCT/JP2017/012727 dated May 16, 2017 [PCT/ISA/210].
Communication dated Nov. 5, 2019, from the European Patent Office in European Application No. 17775130.2.
Communication dated Nov. 13, 2020 by the Japanese Patent Office in corresponding application No. 2017-063565.
Communication dated Nov. 13, 2020 by the Japanese Patent Office in corresponding application No. 2017-063564.

\* cited by examiner

DISPERSION LIQUID, METHOD FOR PRODUCING THE SAME, AND COPPER COMPOUND PARTICLES

CROSS REFERENCE TO RELATED APPLICATIONS

This application is a National Stage of International Application No. PCT/JP2017/012727, filed March 28, 2017, claiming priority based on Japanese Patent Application Nos. 2016-064734 and 2016-064740, filed March 28, 2016 respectively, and Japanese Patent Application No. 2016-247641, filed December 21, 2016.

TECHNICAL FIELD

The present invention relates to a dispersion liquid, a method for producing the same and copper compound particles. More specifically, the present invention relates to copper compound particles having antiviral properties, a dispersion liquid containing the copper compound particles present stably in a dispersion medium, a method for producing the same, and an antiviral formed product.

BACKGROUND ART

Conventionally, silver ions and copper (II) ions have been used as active ingredients for antibacterial and antiviral materials. Various antiviral materials have been proposed, and such antiviral materials are prepared by making these metallic ions to be supported by substances such as zeolite and silica gel or by dispersing these ions in solvents.

The metallic ions can exhibit antiviral properties against viruses such as an influenza virus having an envelope structure, but the ions cannot exhibit the antiviral properties against viruses that do not have such an envelope structure.

A monovalent copper compound is also known as s metallic compound capable of exhibiting antiviral properties regardless of presence of the envelope structure. For instance, Patent document 1 below describes an antiviral composition containing monovalent copper compound fine particles, a reducing agent and a dispersion medium and having pH of not higher than 6. Patent document 2 below describes an antibacterial-antiviral composition containing cuprous oxide particles having a BET specific surface area in a range of 5 to 100 $m^2/g$, saccharides having aldehyde groups and photocatalytic substances. And, Patent document 3 below describes an antiviral coating film having a copper-supported oxide having an average secondary particle diameter in a range of 80 nm to 600 nm, barium sulfate having an average secondary particle diameter in a range of 1 μm to 15 μm, and a water-repellent resin binder, where at least either copper particles or copper compound particles are supported on oxide particles.

PRIOR ART DOCUMENTS

Patent Documents

Patent Document 1: JP5194185
Patent Document 2: JP-A-2013-82654
Patent Document 3: JP-A-2015-205998

SUMMARY OF THE INVENTION

Problems to be Solved by the Invention

However, fine particles of the monovalent copper compound having antiviral properties may aggregate easily in a non-aqueous solvent. In a case of using the dispersion liquid as an antiviral composition or as an antiviral formed product prepared by coating the dispersion liquid as a mixture with a coating material, it is difficult to exhibit efficiently the antiviral properties of the fine particles of the monovalent copper compound.

Further, when a monovalent copper compound of a larger particle diameter as described in the above Patent documents is used, the particle surface area is reduced, the opportunity of contact with viruses may decrease so that the antiviral properties may deteriorate. Another problem is that in the antiviral formed product coated with the monovalent copper compound with a larger particle diameter, the haze and the light transmission may deteriorate to degrade the transparency.

Though fine particles of the monovalent copper compound can be obtained also by pulverization, they may easily aggregate due to absence of a coating agent or a stabilizer. In addition to that, oxidation from cuprous oxide to cupric oxide (copper (II) oxide) may easily occur.

Therefore, an object of the present invention is to provide fine particles of a copper compound, particularly a copper compound that can exhibit efficiently antiviral properties of fine particles of a monovalent copper compound, a dispersion liquid containing the fine particles dispersed homogeneously and stably in a dispersion solvent, and a method for producing the dispersion liquid.

Another object of the present invention is to provide an antiviral formed product comprising the fine particles of the monovalent copper compound, so that the product is capable of exhibiting efficiently the antiviral properties of the fine particles of the monovalent copper compound. The monovalent copper compound fine particles are contained in the antiviral formed product or fixed on the surface of the antiviral formed product.

Means for Solving the Problems

The present invention provides a dispersion liquid including copper compound fine particles and a stabilizer both of which are contained in a non-aqueous solvent, and the copper compound fine particles are coated with fatty acid.

It is preferable in the dispersion liquid of the present invention that:
1. the copper compound is a monovalent copper compound;
2. the copper compound particles are further coated with an ester compound of the fatty acid;
3. the stabilizer is at least one selected from the group consisting of saccharin, salicylic acid, aspartic acid and citric acid;
4. the monovalent copper compound is cuprous oxide;
5. the non-aqueous solvent is a ester-based solvent;
6. the dispersion liquid further contains a dispersant; and
7. the copper compound has antiviral properties.

The present invention provides further a method for producing a dispersion liquid including copper compound fine particles dispersed in the dispersion liquid. The method includes: introducing fatty acid copper and a stabilizer into glycol used as a high boiling point solvent, conducting heat-mixing to prepare a high boiling point solvent dispersion liquid containing the copper compound fine particles and the stabilizer, the copper compound fine particles being coated with fatty acid and dispersed in the high boiling point solvent dispersion liquid, mixing the high boiling point solvent dispersion liquid with a low boiling point solvent blended in advance with a dispersant, and separating the high boiling point solvent and the low boiling point solvent into two phases and extracting the copper compound fine particles coated with fatty acid from the high boiling point solvent into the low boiling point solvent.

Alternatively, the present invention provides a method for producing a dispersion liquid including copper compound fine particles dispersed therein. The method includes: introducing fatty acid, a copper compound and a stabilizer into glycol used as a high boiling point solvent, conducting heat-mixing to prepare a high boiling point solvent dispersion liquid containing the copper compound fine particles and the stabilizer, the copper compound fine particles being coated with fatty acid and dispersed in the high boiling point solvent dispersion liquid, mixing the high boiling point solvent dispersion liquid with a low boiling point solvent blended in advance with a dispersant, and separating the high boiling point solvent and the low boiling point solvent into two phases and extracting the copper compound fine particles coated with fatty acid from the high boiling point solvent into the low boiling point solvent.

It is preferable in the method for producing a dispersion liquid of the present invention that:
1. the heat-mixing in preparation of the high boiling point solvent dispersion liquid is conducted in the presence of water;
2. the copper compound is any one of copper acetate, copper chloride, and copper bromide;
3. the high boiling point solvent is diethylene glycol and the low boiling point solvent is butyl acetate; and
4. the stabilizer is at least one selected from the group consisting of saccharin, salicylic acid, aspartic acid, and citric acid.

The present invention further provides a method for producing a glycol dispersion liquid containing cupric oxide fine particles and saccharin, the cupric oxide fine particles being dispersed in the glycol dispersion liquid. The method includes a step of introducing fatty acid copper and saccharin into glycol and conducting heat-mixing to decompose the fatty acid copper.

It is particularly preferable in the method for producing a glycol dispersion liquid of the present invention that the heat-mixing is conducted in the presence of water.

Further, the present invention provides copper compound fine particles coated with fatty acid and an ester compound of the fatty acid.

It is particularly preferable that the copper compound particles are monovalent copper compound particles.

The present invention further provides an antiviral formed product including an antiviral composition. The antiviral composition is contained in the antiviral formed product or fixed on the outermost surface of the antiviral formed product, the antiviral composition contains monovalent copper compound particles and a stabilizer, and the monovalent copper compound particles are coated with fatty acid.

It is preferable in the antiviral formed product of the present invention that:
1. the monovalent copper compound particles are further coated with an ester compound of the fatty acid;
2. the stabilizer is at least one selected from the group consisting of saccharin, salicylic acid, aspartic acid, and citric acid;
3. the monovalent copper compound particles react with oxygen in the air so as to generate active oxygen of not less than 300,000 counts per 15 cm$^2$ of the antiviral formed product; and
4. the formed product has a coating film containing the antiviral composition and formed on a base.

Effects of the Invention

In the dispersion liquid of the present invention, the copper compound fine particles are coated with fatty acid, preferably with fatty acid and an ester compound of the fatty acid. As a result, the copper compound fine particles may be dispersed homogeneously without aggregation even when the copper compound fine particles are contained in a non-aqueous solvent at a high concentration, thereby exhibiting efficiently the excellent properties of the copper compound fine particles. In particular, since the copper compound is a monovalent copper compound, it can exhibit efficiently its antiviral properties against viruses that do not have envelope structures, as mentioned above.

Further in the dispersion liquid of the present invention, it is considered that a stabilizer blended in the dispersion liquid coordinates as a protective layer with the copper compound fine particles. As a result, even a less stable monovalent copper compound is capable of stably maintaining its monovalence, and thus, the copper compound fine particles may be dispersed homogeneously in the non-aqueous solvent without sedimentation, due to synergy with the aforementioned coating with fatty acid and further with the ester compound of the fatty acid. The dispersion liquid can be used preferably as a dilution solvent for a coating composition of a resin composition, thereby enabling to impart various properties to a coating film or a resin formed product.

The dispersion liquid of the present invention may be contained as a diluent in a resin composition that constitutes a textile product or the like, or it may be coated on directly or impregnated in a textile product or the like. Alternatively, the dispersion liquid is mixed with a binder resin and the mixture is coated on a textile product or the like. In this manner, it is possible to impart antiviral properties to the textile product or the like.

Alternatively, the dispersion liquid of the present invention may be mixed with a coating material to be used for a coating process. In this manner, it can be incorporated into the surface of a film, a sheet or a metal plate thereby imparting antiviral properties to the surface or outside of a base.

Further in the method for producing the dispersion liquid of the present invention, fatty acid copper and a stabilizer are blended in a high boiling point solvent and heat treatment is conducted. In this manner, it is possible to form cuprous oxide fine particles having surfaces coordinating with fatty acid or preferably with fatty acid and an ester compound of the fatty acid. Since the cuprous oxide fine particles have excellent compatibility with the low boiling point solvent, the cuprous oxide fine particles may be extracted from the high boiling point solvent efficiently in a simple operation into the low boiling point solvent, thereby allowing the cuprous oxide fine particles to be present at a high concentration in the low boiling point solvent.

Particularly in the production method of the present invention, the heat-mixing is conducted in the presence of water during preparation of the high boiling point solvent dispersion liquid, thereby enabling preparation of monovalent copper compound particles. As a result, it is possible to provide a dispersion liquid that contains monovalent copper compound particles capable of exhibiting excellent antiviral properties regardless of presence of an envelope structure, as mentioned above.

The antiviral formed product of the present invention may have an antiviral composition containing monovalent copper compound fine particles modified with fatty acid, or preferably modified with fatty acid and an ester compound of the fatty acid, and also a stabilizer. Since the antiviral composition is contained in the formed product or it is fixed on the surface of the formed product, the monovalent copper compound fine particles may not fall off from the formed product, and thus, the excellent antiviral properties of the monovalent copper compound fine particles can be exhibited efficiently.

Further, the antiviral composition used in the formed product of the present invention can exhibit excellent antiviral properties since the monovalent copper compound fine particles in the antiviral composition with smaller diameter react efficiently with oxygen in the air to generate active oxygen.

It is also considered that the stabilizer blended in the antiviral composition coordinates as a protective layer with the monovalent copper compound fine particles. This may serve for the monovalent copper compound fine particles to maintain stably its monovalence. Moreover, since the coating of the fatty acid, or preferably the coating of the fatty acid and an ester compound of the fatty acid is provided, direct contact between the monovalent copper compound microparticle surface and the resin is decreased even in a case of being blended with a resin composition. This serves to efficiently prevent or retard decomposition of resin to decrease lowering or the like of the molecular weight of the resin, thereby effectively preventing impairment in moldability or processability. Further, the monovalent copper compound fine particles may be present homogeneously and stably on the surface of the formed product, thereby making it possible to impart excellent antiviral properties to the formed product for a long period of time.

Figure 1:
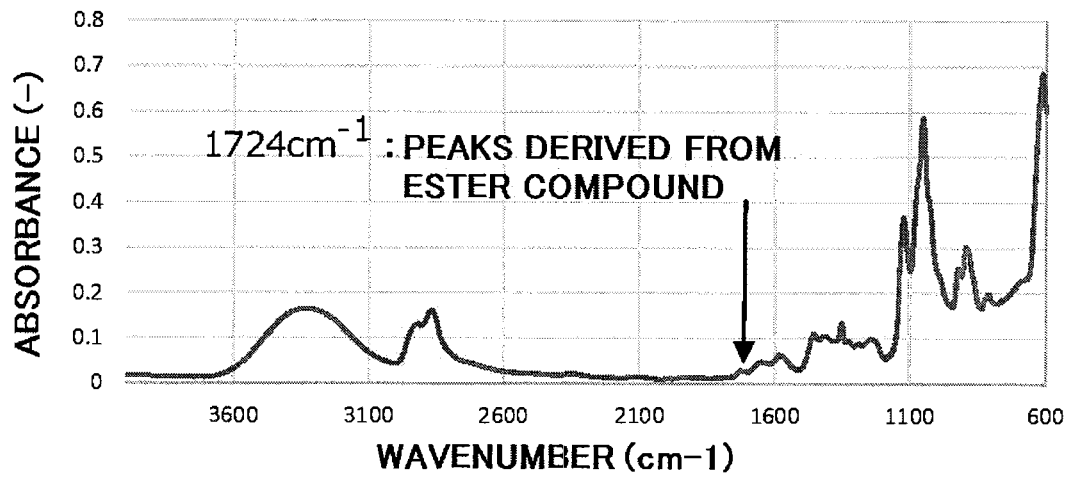
FIG. 1 is an IR chart of Experimental Example 1.

MODE FOR CARRYING OUT THE INVENTION (Dispersion Liquid)

As mentioned above, the dispersion liquid of the present invention contains copper compound fine particles and a stabilizer in a non-aqueous solvent, and the copper compound fine particles coated with fatty acid are either monovalent copper compound particles or divalent copper compound particles.

[Copper Compound Fine Particles]

The copper compound that is an active ingredient exhibiting antiviral properties in the dispersion liquid of the present invention is either a monovalent copper compound or a divalent copper compound, each of which is capable of adsorbing and inactivating viruses. The divalent copper compound has antiviral properties against viruses having an envelope structure, while the monovalent copper compound can exhibit antiviral properties regardless of presence of envelopes of viruses.

Examples of the copper compound include oxides, acetic acid compounds, chlorides, bromides, hydroxides, and cyanides. Among them, cuprous oxide is particularly preferred.

In the present invention, the surfaces of the copper compound fine particles are coated with fatty acid, and particularly preferably coated with fatty acid and an ester compound of the fatty acid. Although the surfaces of the copper compound fine particles may be oxidized due to enhancement in the surface activity of the fine particles, the coating may prevent the oxidation and can prevent or control aggregation of the fine particles. The monovalent copper compound particles have particularly high surface activity, and thus, they may be easily oxidized to aggregate. However, since the particles are coated with fatty acid and an ester compound of the fatty acid, the particles are dispersed homogeneously in the dispersion liquid so as to exhibit excellent antiviral properties.

Further, the copper compound fine particles contained in the dispersion liquid of the present invention has antibacterial properties, electro-conductivity, ultraviolet-shielding property, antifouling property and the like as well as the antiviral properties.

Examples of the fatty acid to coat the surfaces of copper compound fine particles include myristic acid, stearic acid, oleic acid, palmitic acid, n-decanoic acid, paratoluic acid, succinic acid, malonic acid, tartaric acid, malic acid, glutaric acid, adipic acid and acetic acid. They can be used as a combination of plural types thereof. Among them, stearic acid is particularly preferred.

The ester compound of the fatty acid is an ester compound with a high boiling point solvent mentioned below. The examples include diethylene glycol distearate and ethylene glycol distearate when the fatty acid and the high boiling point solvent are stearic acid and diethylene glycol, respectively. As mentioned above, the particles coated with an ester compound of a fatty acid together with the coating of the fatty acid can provide the aforementioned effects more remarkably in comparison with a case where the particles are coated with only the fatty acid.

In the present invention, the average particle diameter of the copper compound fine particles is in a range of 1 to 200 nm, and particularly preferably 1 to 50 nm. The copper compound fine particles are dispersed homogeneously without aggregation in the dispersion liquid of the present invention even when the concentration is high, and thus, excellent antiviral properties can be exhibited efficiently due to the synergy imparted by the copper compound fine particles having an average particle diameter within the aforementioned range. In the dispersion liquid (antiviral composition) containing the copper compound fine particles of a small average particle diameter, the copper compound fine particles may get contact with oxygen with high probability. Therefore, the dispersion liquid can generate active oxygen efficiently, thereby exhibiting excellent antiviral properties. In calculation of the average particle diameter in the present Specification, a plurality of copper compound fine particles having no space therebetween are regarded as constituting one particle.

The copper compound fine particles, which are coated with fatty acid or preferably coated with both fatty acid and an ester compound of the fatty acid, are contained in the dispersion liquid in an amount of 0.01 to 2% by weight, and particularly preferably 0.05 to 1% by weight. When the amount of the copper compound fine particles is smaller than the range, sufficient antiviral properties cannot be exhibited in comparison with a case where the amount is within the range. When the amount of the copper compound fine particles is larger than the range, the economic advantage may deteriorate in comparison with a case where the amount is within the range, and furthermore, the coatability or the formability may deteriorate when the fine particles are used for a coating composition or a resin composition.

[Stabilizer]

Since the dispersion liquid of the present invention contains a stabilizer, the copper compound fine particles can be maintained stably in either a monovalent or divalent state. In addition, since the copper compound fine particles have surfaces coated with fatty acid, the fine particles are resistant to oxidation. As a result, the copper compound fine particles can be present in the dispersion liquid stably for a long period of time. The stabilizer is considered as coordinating with the copper compound fine particles, though it may be in a dissolved state depending on a non-aqueous solvent in use.

Examples of the stabilizer include saccharin, salicylic acid, aspartic acid, and citric acid. Among them, saccharin can be used preferably.

It is preferable that the stabilizer is contained in the dispersion liquid in an amount of 0.01 to 0.1% by weight, and particularly preferably 0.02 to 0.05% by weight. When the amount of the stabilizer is smaller than the range, stability of the copper compound fine particles may deteriorate in comparison with a case where the amount is within the range; when the amount of the stabilizer is larger than the range, any further effect cannot be expected but the economic advantage may be impaired.

[Non-Aqueous Solvent]

Examples of the non-aqueous solvent in the dispersion liquid of the present invention include low boiling point solvents, namely, esters such as methyl acetate, ethyl acetate, and butyl acetate; hydrocarbons such as hexane, heptane, toluene, xylene, and cyclohexane; and ketones such as methyl isobutyl ketone, methyl ethyl ketone, and cyclohexanone. Among them, ester-based solvents are preferred, and in particular, butyl acetate is preferred.

The dispersion liquid of the present invention can be used effectively as a diluent for a hydrophobic coating composition or a resin composition, since the non-aqueous solvent is any of the above-described low boiling point solvents.

[Others]

The dispersion liquid of the present invention preferably contains a dispersant, together with the copper compound fine particles and the stabilizer described above. As a result, even when the dispersion liquid contains the copper compound fine particles at a high concentration, the copper compound fine particles can be dispersed homogeneously in the dispersion liquid.

An example of the dispersant is a polymer dispersant having: at least one of primary, secondary, or tertiary amine or an amine salt thereof prepared by neutralizing the counter ion, carboxylic acid or carboxylic acid salt, and a hydroxyl group at its adsorptive group; and fatty acid, polyether, polyester, polyurethane, and polyarylate at its main chain and side chain.

These dispersants having adsorptive groups may be adsorbed on the surfaces of the copper compound fine particles. Their main chains or side chains improve the compatibility with the non-aqueous solvent, and the polymer chain may cause a steric barrier to generate repulsion. As a result, aggregation of the copper compound fine particles may be prevented or reduced, and thus, the copper compound fine particles may be dispersed homogeneously in the non-aqueous solvent. This can prevent temporal aggregation.

The polymer dispersant that can be used for this purpose may comprise a polymer constituted of a main chain only, or a comb-shaped polymer having a side chain, and a star-shaped polymer.

The dispersant is contained preferably in the dispersion liquid in an amount of 0.01 to 2% by weight, or particularly preferably in a range of 0.1 to 1% by weight. When the amount of the dispersant is less than the above range, further improvement in the dispersion properties of the copper compound fine particles may not be expected in comparison with a case where the amount is within the range. Even when amount of the dispersant is more than the range, any further improvement in the effect cannot be expected, and the economic advantages may be impaired.

It is also possible to blend in the dispersion liquid of the present invention any conventionally known additives, such as an antioxidant, an ultraviolet absorber, an antistatic agent, and a dye, in accordance with any of the conventionally known processes.

(First Method for Producing Dispersion Liquid)

The dispersion liquid of the present invention has cupric oxide fine particles coated with fatty acid and dispersed in a low boiling point solvent. The dispersion liquid can be prepared by a method as described below.

(1) First Process

Fatty acid copper and a stabilizer are added to a high boiling point solvent, which is then heated. The thus prepared high boiling point solvent dispersion liquid may contain cupric oxide fine particles and a stabilizer, and the dispersed particles have surfaces coated with fatty acid or preferably coated with both of the fatty acid and an ester compound of the fatty acid.

At this time, water is included with the high boiling point solvent so that the cupric oxide fine particles can be turned into monovalent cuprous oxide fine particles.

It is preferable that the heating temperature is lower than the temperature at which the fatty acid in use starts decomposition, specifically in a range of 180 to 230° C. The time for heat-mixing is preferably from 120 to 360 minutes.

It is preferable that the blend amount of the fatty acid copper is in a range of 0.1 to 5 parts by weight per 100 parts by weight of the high boiling point solvent. When the amount of the fatty acid copper is less than the above range, it may be impossible to impart sufficient antiviral properties to the dispersion liquid in comparison with a case where the amount is within the range. When the amount of the fatty acid copper is more than the above range, the economic advantages may be impaired and further coatability and formability may deteriorate in comparison with a case where the amount is within the range.

It is preferable that the blend amount of water is in the range of 0.1 to 5 parts by weight per 100 parts by weight of the high boiling point solvent. When the water amount is less than the range, the amount of the generated cuprous oxide may be decreased. When the content is more than the range, the rate for generating the cuprous oxide may be increased to increase the particle diameter.

It is preferable that the blend amount of the stabilizer is in a range of 0.01 to 0.1 parts by weight per 100 parts by weight of the high boiling point solvent. When the amount of the stabilizer is less than the above range, the cupric oxide may not be stabilized for a long period of time in comparison with a case where the amount is within the range. When the amount of the stabilizer is more than the above range, the stability of the cupric oxide fine particles cannot be improved further and the economic advantage may be impaired in comparison with a case where the amount is within the range.

Examples of the high boiling point solvent include glycols such as ethylene glycol, diethylene glycol, triethylene glycol, and polyethylene glycol. They can be selected appropriately, considering the combination with the low boiling point solvent mentioned below.

(2) Second Process

Next, the high boiling point solvent dispersion liquid and a low boiling point solvent are mixed to prepare a mixture. Here, the high boiling point solvent dispersion liquid contains cupric oxide fine particles and a stabilizer, and the cupric oxide fine particles dispersed in the liquid are coated with fatty ester, or preferably with fatty acid and an ester compound of the fatty acid. The low boiling point solvent is blended in advance with a dispersant.

It is preferable that the low boiling point solvent is added to the high boiling point solvent dispersion liquid in an amount of 10 to 200 parts by weight per 100 g by part of the high boiling point solvent. The blend amount of the dispersant in the low boiling point solvent is preferably in a range of 0.01 to 2 parts by weight per 100 parts by weight of the low boiling point solvent, and it may vary depending on the amount of the cupric oxide fine particles in the high boiling point solvent dispersion liquid, where the particles are coated with fatty acid or preferably coated with fatty acid and an ester compound of the fatty acid.

For the low boiling point solvent, the aforementioned non-aqueous solvent of the dispersion liquid can be used. The low boiling point solvent is required to be incompatible with the high boiling point solvent, and preferably, the high boiling point solvent and the low boiling point solvent are combined so that the difference in the solubility parameter (Sp value) therebetween will be 3 or more.

When diethylene glycol (Sp value: 12.6) is used as the high boiling point solvent, butyl acetate (Sp value: 8.4) is preferably used as the low boiling point solvent.

(3) Third Process

The mixture is allowed to stand still for 30 to 120 minutes at a temperature in a range of 0 to 40° C., so that the high boiling point solvent and the low boiling point solvent are phase-separated. As a result of the phase separation of the mixture, the cupric oxide fine particles in the mixture, which are coated with fatty acid or preferably with fatty acid and an ester compound of the fatty acid, are extracted into the low boiling point solvent. Since the dispersant is blended in the low boiling point solvent of the present invention, the absorptive groups of the dispersant coordinate with the cupric oxide fine particles, whereby the cupric oxide fine particles may be easily extracted into the low boiling point solvent.

Next, the high boiling point solvent is removed from the phase-separated mixture, thereby obtaining a dispersion liquid containing the cupric oxide fine particles dispersed therein, where the fine particles are coated with fatty acid or preferably coated with fatty acid and an ester compound of the fatty acid.

The high boiling point solvent can be removed by any conventionally known methods such as simple distillation, reduced pressure distillation, rectification, membrane distillation, extraction, and membrane separation.

In the first process, not only the fatty acid copper and the stabilizer but sodium chloride, sodium bromide and the like are blended in the high boiling point solvent, whereby the copper compound fine particles dispersed in the dispersion liquid can be made into copper halide fine particles.

(Second Method for Producing Dispersion Liquid)

The dispersion liquid of the present invention may comprise a low boiling point solvent in which copper compound fine particles are dispersed, and the particles are coated with fatty acid or preferably coated with fatty acid and an ester compound of the fatty acid. The dispersion liquid can be produced by the aforementioned method, or an alternative method described below.

That is, the processes are similar to those of the aforementioned first method except that a combination of fatty acid and a copper compound is added in place of the fatty acid copper during the first process of the aforementioned first production method.

As a result, for instance, in a case of using copper acetate as the copper compound, it is possible to prepare a dispersion liquid containing copper acetate fine particles dispersed therein, where the copper acetate fine particles are coated with fatty acid or preferably with fatty acid and an ester compound of the fatty acid.

Like the first method, water is added together with the high boiling point solvent during the first process of the second method, whereby the monovalent copper acetate fine particles coated with fatty acid and an ester compound of the copper acid can be dispersed in the low boiling point solvent.

(Third Method for Producing Dispersion Liquid)

The dispersion liquid obtained in the first process of the aforementioned first or second production method contains the copper compound fine particles dispersed in glycol as a high boiling point solvent, and the copper compound fine particles are coated with fatty acid or preferably with fatty acid and an ester compound of the fatty acid. In the present invention, the dispersion liquid can be used as it is.

That is, a combination of fatty acid copper and saccharin, or a combination of fatty acid, copper compound and saccharin is added to a glycol, which is then heat-mixed. In this manner, a glycol dispersion liquid containing copper compound fine particles and saccharin can be prepared, and the particles are dispersed therein.

Like the aforementioned methods, water is present with the glycols in this case, so that the copper compound fine particles can be prepared as monovalent copper compound fine particles, and excellent antiviral properties can be exhibited.

(Method for Producing Dispersion Liquid Using a Dispersion Medium of a Non-Aqueous Solvent Compatible with Glycols)

In the present invention, a dispersion liquid comprising a dispersion medium such as ethanol or isopropanol as a low boiling point solvent compatible with glycols can be prepared. In such a case, a low boiling point solvent in the dispersion liquid prepared by the aforementioned first or second production method is removed by heating to make a paste, and thereafter, the particles are re-dispersed in any of the aforementioned dispersion media.

As mentioned above, in the first and second production method, the copper compound fine particles in the high boiling point solvent are extracted into the low boiling point solvent by means of two-phase separation. In this two-phase separation, combination of the low boiling point solvent and the high boiling point solvent is important. It is difficult to disperse the copper compound fine particles in the target low boiling point solvent if the low boiling point solvent is compatible with the high boiling point solvent. However, according to the method of removing the low boiling point solvent in the dispersion liquid to make a paste as described above, various low boiling point solvents can be applied to provide a dispersion liquid comprising cupric oxide fine particles that are coated with fatty acid and that are dispersed in the low boiling point solvent.

The conditions for heat-mixing and extraction may be the same as those for the first process to the third process in the aforementioned method for producing a dispersion liquid.

(Antiviral Formed Product)

The antiviral formed product of the present invention contains an antiviral composition containing a monovalent copper compound fine particles coated with fatty acid and also a stabilizer. Alternatively, the antiviral composition is fixed on the outermost surfaces of the formed product. Due to the essential feature of the antiviral formed product, the monovalent copper compound fine particles react with oxygen to generate active oxygen, thereby exhibiting excellent antiviral properties.

The antiviral composition used for producing the antiviral formed product of the present invention is not limited particularly as long as it contains monovalent copper compound fine particles coated with fatty acid and also a stabilizer, and as long as it can be included in the formed product or present on the surface of the formed product. Particularly preferably, it is a composition containing monovalent copper compound fine particles and a stabilizer, where the monovalent copper compound fine particles are dispersed in a non-aqueous solvent and coated with fatty acid or preferably coated with fatty acid and an ester compound of the fatty acid. For the dispersion liquid, the aforementioned dispersion liquid or a dispersion liquid prepared by removing a solvent from the dispersion liquid and by re-dispersing the particles in a desired solvent can be used.

In the antiviral formed product of the present invention, the aforementioned dispersion liquid as the antiviral composition may be used preferably for a dilution solvent for a coating composition or a resin composition. This can make it possible to impart antiviral properties to a coating film formed of the coating composition or a resin formed product formed of the resin composition, without sacrificing the transparency of the coating composition or the resin composition.

The coating compositions may be based on thermosetting resins, photocurable acrylic resins or the like. Examples of the thermosetting resins include phenol resin, epoxy resin, urethane resin, melamine resin, urea resin, alkyd resin, unsaturated polyester resin, and silicone resin.

The resin composition may include the thermosetting resins mentioned above and further any thermoplastic resins. Examples of the thermoplastic resins include: olefin resins such as low-, intermediate- and high density polyethylenes, linear low density polyethylene, linear ultralow density polyethylene, isotactic polypropylene, syndiotactic polypropylene, a propylene-ethylene copolymer, a polybutene-1, ethylene-butene-1 copolymer, a propylene-butene-1 copolymer, and an ethylene-propylene-butene-1 copolymer; polyester resins such as polyethylene terephthalate, polybutylene terephthalate, and polyethylene naphthalate; polyamide resins such as nylon 6, nylon 6,6 and nylon 6,10; and polycarbonate resins.

Specific examples thereof include a formed product including a base of a nonwoven fabric, a resin film, a textile product or the like, on which a coating composition containing an antiviral composition is coated to form a coating film. An alternative formed product is provided by directly forming a formed product of a film, a sheet, a nonwoven fabric or a fiber from the resin composition containing an antiviral composition.

EXAMPLES

Experimental Example 1

2.5% by weight of copper stearate and 0.05% by weight of saccharin were added to diethylene glycol, which were then heated while being stirred to make a diethylene glycol dispersion liquid. 4.0% by weight of distilled water was added thereto at the time the temperature reached 140° C., and the liquid was further heated. After the temperature reached 190° C., the heat treatment was continued for 4 hours, and then, the diethylene glycol dispersion liquid was cooled to 60° C.

Then, butyl acetate containing 1.0% by weight of dissolved dispersant DISPERBYK-2090 (manufactured by BYK Additives and Instruments) was added thereto and stirred. After allowing the mixture to stand still for about 1 hour, a stratum of the butyl acetate was collected to obtain a cuprous oxide fine particles dispersion liquid.

Experimental Example 2

A dispersion liquid was produced in a manner similar to that of Experimental Example 1 except that the heating temperature was set to 210° C.

Experimental Example 3

A dispersion liquid was produced in a manner similar to that of Experimental Example 1 except that salicylic acid was added in place of saccharin.

Experimental Example 4

A dispersion liquid was produced in a manner similar to that of Experimental Example 1 except that the heating temperature was set to 170° C.

Experimental Example 5

A dispersion liquid was produced in a manner similar to that of Experimental Example 1 except that the diethylene glycol was replaced by glycerol.

Experimental Example 6

A dispersion liquid was produced in a manner similar to that of Experimental Example 1 except that no water was added at the time the diethylene glycol was heated to 140° C.

Experimental Example 7

1.0% by weight of commercially available cuprous oxide powder was added to butyl acetate, which was then stirred.

Experimental Example 8

1.0% by weight of commercially available copper stearate powder was added to butyl acetate, which was then stirred.

(Zeta Potential Evaluation Method)

Zeta potential was measured at a measurement voltage of 300 V by using a potential •particle diameter •molecular weight measurement system ELSZ-2000ZS manufactured by OTSUKA ELECTRONICS Co., LTD. The dispersion stability is higher when the absolute value of the zeta potential is greater, and the dispersion is favorable when the absolute value of the zeta potential is 30 (mV) or more. Table 1 shows measurement results for Experimental Examples 1 to 8.

(Temporal Stability Evaluation Method)

The condition of the dispersion liquid after one week from the production was checked visually. A circle ○ indicates that no precipitation of particles was found (i.e., temporal stability is high), and an inclined cross x indicates that precipitation of particles was found (i.e., temporal stability is low). Table 1 shows measurement results for Experimental Examples 1 to 8.

(Particle Diameter Measurement Method)

The diameter of the obtained particles was measured based on SEM images using image processing software. Particles in each of the dispersion liquids were collected by filtration, which were then observed and images thereof were taken using a microscope S-4800 manufactured by Hitachi High-Technologies Corporation. Powders of commercially available products were observed and their images were taken in a similar way. From the images, average particle diameters of freely-selected several dozens of particles were calculated using image analysis type particle size distribution software Mac-view manufactured by Mountech Co., Ltd. The results are shown in Table 1.

(Checking of Fatty Acid Ester Compound Generation in Solvent)

For the dispersion liquid in Experimental Example 1, generation of an ester compound from a diethylene glycol solvent and stearic acid dissociated from copper stearate was checked by IR. The results are shown in FIG. 1.

(Identification of Fatty Acid Ester Compound in Solvent)

Figure 2:
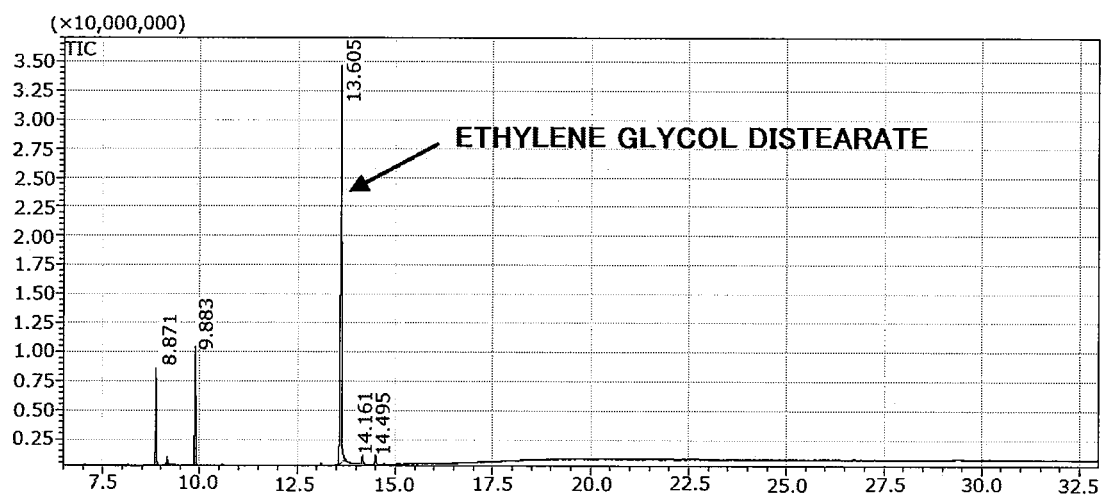
FIG. 2 shows GC-MS measurement result (TIC) of Experimental Example 1.

Identification of the generated ester compound for the dispersion liquid in Experimental Example 1 was conducted using GC-MSQP-2010 manufactured by Shimadzu Corporation. The results are shown in FIG. 2.

(Checking of Particle Composition)

Figure 3:
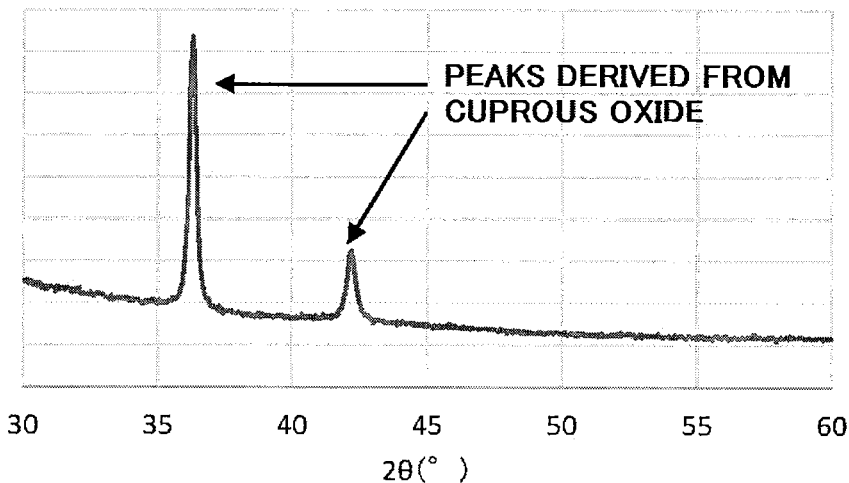
FIG. 3 shows an X-ray diffraction profile of the particles of Experimental Example 1.

The composition of copper compound particles in the dispersion liquid of Experimental Example 1 was analyzed using an X-ray diffraction. The results are shown in FIG. 3.

TABLE 1

|  | Copper composition | Zeta potential (mV) | Temporal stability | Particle diameter |
|---|---|---|---|---|
| Experimental Example 1 | Cuprous oxide | 52.53 | ○ | 150 nm |
| Experimental Example 2 | Cuprous oxide | 44.30 | ○ | 180 nm |
| Experimental Example 3 | Cuprous oxide | 28.81 | ○ | 570 nm |
| Experimental Example 4 | Copper stearate | 9.82 | x | 2-3 μm |
| Experimental Example 5 | Metallic copper | 11.63 | x | 100 nm |
| Experimental Example 6 | Metallic copper | 5.10 | x | 110 nm |
| Experimental Example 7 | Cuprous oxide | 3.24 | x | 2-3 μm |
| Experimental Example 8 | Copper stearate | 4.20 | x | 2-3 μm |

<Antiviral Property Evaluation>

(Method of Coating Dispersion Liquid on Nonwoven Fabric)

90% by weight of the thus obtained dispersion liquid, 9.9% by weight of photocurable acrylic resin as a binder resin, and 0.1% by weight of photopolymerization initiator were mixed to make a coating liquid. An unprocessed nonwoven fabric was immersed in the coating liquid. The nonwoven fabric taken out from the coating liquid was introduced into a roller type squeezer to remove excessive liquid, and dried for 2 minutes using a dryer at 90° C. Later, it was irradiated with UV for 10 minutes, whereby a nonwoven fabric with the cuprous oxide fine particles fixed thereon was obtained.

The nonwoven fabrics obtained in Experimental Examples 1, 7 and 8 were subjected to an antiviral property evaluation. The nonwoven fabrics obtained in Experimental Examples 1, 7 and 8 were subjected to measurement of active oxygen generation amount. The results for both are shown in Table 2.

(Method of Evaluating Antiviral Properties of Nonwoven Fabric)

1. Host cells are infected with viruses, and after cultivation, the cell residues are eliminated by centrifugation to prepare a virus suspension liquid.
2. The virus suspension liquid of the above 1. is diluted 10 times with a sterilized distilled water to prepare a test virus suspension liquid.
3. 0.4 g of test piece of nonwoven fabric is inoculated with 0.2 mL of the test virus suspension liquid.
4. After allowing stand for 2 hours at 25° C., 20 mL of SCDLP medium is added and the liquid is stirred with a vortex mixer, thereby washing out the viruses from the specimen.
5. Virus Infectivity Titer is measured by plaque measurement method, thereby calculating antiviral activation value.
6. When the antiviral activation value is 3.0 or more, it indicates sufficient antiviral properties against the virus.

(Method for Measuring Amount of Generated Active Oxygen of Nonwoven Fabric)

1. A nonwoven fabric of 0.03 g (1 cm×15 cm) is introduced into a 1.5 mL microtube.
2. 10 mL of distilled water and 10 μL of luminescent reagent (2-methyl-6-p-methoxyphenylethynylimidazopyrazinane solution) are added before measuring emission with a luminometer (AB-2270 Luminescencer Octa manufactured by ATTO corporation) to set an amount of generated active oxygen.

TABLE 2

|  | Copper composition | Antiviral activation value against influenza virus | Antiviral activation value against feline calicivirus | Amount of generated active oxygen (counts) |
|---|---|---|---|---|
| Experimental Example 1 | Cuprous oxide | ≥4.5 | 3.7 | 2,922,000 |
| Experimental Example 7 | Cuprous oxide | 0.5 | 0.2 | 205,000 |
| Experimental Example 8 | Copper stearate | 0 | 0 | 39,000 |

INDUSTRIAL APPLICABILITY

The copper compound fine particles contained in the dispersion liquid of the present invention have various properties such as antiviral properties, antibacterial properties, conductivity, ultraviolet shielding property, and antifouling property. In particular, when the copper compound particles are monovalent, it can exhibit antiviral properties even against viruses such as a norovirus having no envelope structure, and thus, it can impart antiviral properties to textile products by introducing as a diluent to a resin composition constituting the textile product or the like, or by directly coating or impregnating the liquid on a textile product or the like.

It can be applied not only to sanitary products but to various purposes such as conductive films, films, metal sheets, glass sheets, and marine paints.

Further, by using the low boiling point solvent as a dispersion medium, it can be used as a diluent for a coating composition or a resin composition, thereby imparting antiviral properties to a coating film or a resin formed product.

The dispersion liquid of the present invention can be suitably used for textile products such as masks, air conditioner filters, filters for air purifiers, clothes, work clothes, curtains, carpets, automobile parts, sheets, towels and cleaning articles such as wipers.

It can also be used for medical devices, packaging films for medical devices, waste containers, garbage bags, wall materials and flooring materials in nursing care facilities or public facilities such as hospitals and schools, wax coat materials, tools for discharging vomit and the like.

Furthermore, the formed product of the present invention contains monovalent copper compound particles each having a surface coated with fatty acid. Alternatively, the monovalent copper compound particles may be fixed on the surface of the formed product. Therefore, it is possible to make the monovalent copper compound particles react with oxygen efficiently to generate active oxygen, thereby exhibiting excellent antiviral properties. The formed product can be applied to various usages such as the aforementioned textile products and heat exchanger fins.

The invention claimed is:

1. An antiviral formed product including an antiviral composition, wherein the antiviral composition is contained in the antiviral formed product or fixed on the outermost surface of the antiviral formed product, and the antiviral composition contains monovalent copper compound particles and a stabilizer, the monovalent copper compound particles being coated with fatty acid, and the stabilizer is at least one selected from the group consisting of saccharin and salicylic acid.

2. The antiviral formed product according to claim 1, wherein the monovalent copper compound particles are further coated with an ester of the fatty acid.

3. The antiviral formed product according to claim 1, wherein the monovalent copper compound particles react with oxygen in the air so as to generate active oxygen of not less than 300,000 counts per 15 cm$^2$ of the antiviral formed product.

4. The antiviral formed product according to claim 1, including a coating film that contains the antiviral composition and that is formed on a base.

* * * * *